(12) United States Patent
Loof et al.

(10) Patent No.: US 9,829,038 B2
(45) Date of Patent: Nov. 28, 2017

(54) BEARING AND BEARING ARRANGEMENT

(71) Applicants: Marcus Loof, Nol (SE); Peter James, Mölndal (SE); Lars Stigsjöö, Angered (SE)

(72) Inventors: Marcus Loof, Nol (SE); Peter James, Mölndal (SE); Lars Stigsjöö, Angered (SE)

(73) Assignee: AKTIEBOLAGET SKF, Gothenburg (SE)

( * ) Notice: Subject to any disclaimer, the term of this patent is extended or adjusted under 35 U.S.C. 154(b) by 18 days.

(21) Appl. No.: 15/089,804

(22) Filed: Apr. 4, 2016

(65) Prior Publication Data

US 2016/0298678 A1 Oct. 13, 2016

(30) Foreign Application Priority Data

Apr. 9, 2015 (SE) ...................................... 1550423

(51) Int. Cl.
*F16C 23/08* (2006.01)
*F16C 33/48* (2006.01)
*F16C 33/49* (2006.01)
*F16C 19/38* (2006.01)

(52) U.S. Cl.
CPC ............ *F16C 23/086* (2013.01); *F16C 33/48* (2013.01); *F16C 33/495* (2013.01); *F16C 19/38* (2013.01)

(58) Field of Classification Search
CPC ...... F16C 19/38; F16C 23/086; F16C 23/088; F16C 25/08; F16C 33/4676; F16C 33/4682; F16C 33/49; F16C 33/494; F16C 33/497; F16C 33/498; F16C 33/585
See application file for complete search history.

(56) References Cited

U.S. PATENT DOCUMENTS

| 4,472,006 A * | 9/1984 | Goransson ............ F16C 23/086 384/576 |
| 8,007,184 B2 * | 8/2011 | Murai ..................... F16C 19/38 384/450 |
| 2013/0223785 A1* | 8/2013 | Yamamoto ............. F16C 19/28 384/576 |
| 2014/0301690 A1* | 10/2014 | Honjo ................. F16C 33/4682 384/576 |

FOREIGN PATENT DOCUMENTS

| JP | 2008008445 A | * | 1/2008 | ............. F16C 33/48 |
| JP | 2010025191 A | * | 2/2010 | ............. F16C 33/48 |

* cited by examiner

*Primary Examiner* — Phillip A Johnson
(74) *Attorney, Agent, or Firm* — Bryan Peckjian; SKF USA Inc. Patent Dept.

(57) ABSTRACT

A spherical roller bearing providing an outer ring having at least one inner raceway, an inner ring including a first and a second outer raceway, a plurality of roller elements arranged in a first and second roller row in-between the at least one inner raceway and the respective first and second outer raceway. The bearing includes a cage for retaining the roller elements in the rows. The cage provides a plurality of cage pockets where roller element is disposed in each. The cage is arranged such that; during operation, a loaded zone of the bearing is located at a radial top region of the bearing, the cage is roller centered on the axially inner ends of the roller elements, and when, during operation, a loaded zone is located at a radial bottom region of the bearing, the cage is under-pitch roller centered in relation to a pitch circle diameter (PCD).

12 Claims, 6 Drawing Sheets

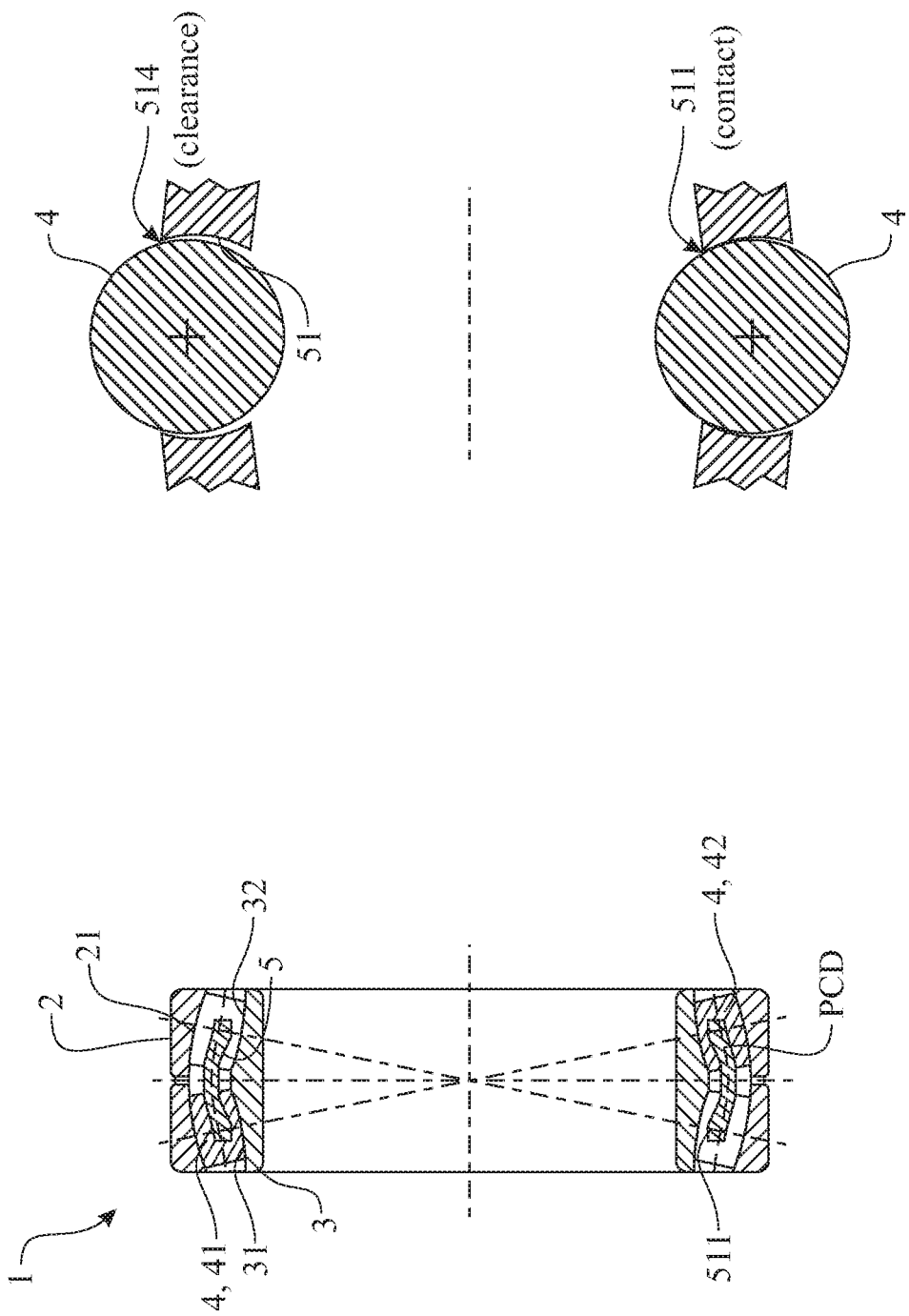

BEARING AND BEARING ARRANGEMENT

CROSS-REFERENCE TO RELATED APPLICATIONS

This application claims priority to Swedish patent application no. 1550423-6 filed on Apr. 9, 2015, the contents of which are fully incorporated herein by reference.

TECHNOLOGICAL FIELD

According to a first aspect, the invention regards a spherical roller bearing. According to a second aspect, the invention regards a bearing arrangement.

BACKGROUND

Spherical roller bearings are well known for its ability to accommodate radial and axial loads, but also for its misalignment ability. These bearings are used in many different applications, especially in more demanding applications where there are larger loads and also where there may be shaft deflections. One example of where a spherical roller bearing can be advantageously used is in wind turbine applications. Other examples of areas where these bearings can be a suitable alternative is in pulp and paper machines, marine applications, off-highway applications and in mining applications.

There are several different designs available. For instance, there are spherical roller bearings comprising comb-shaped cages, but also bearings comprising window type cages. In addition, some of the known designs include guide rings and other bearing types include mid-flanges on the inner rings. The different designs present different advantages and are thus useful and adapted to different needs. The bearings may for instance be optimized for different circumstances and environments, such as for high or low speed applications, mainly for radial loads, mainly for axial loads, for large shaft deflections etc.

SUMMARY OF THE INVENTION

In view of the above, an object of the present invention is to provide a new spherical roller bearing design and bearing arrangement which alleviates at least some of the drawbacks of the prior art. Moreover, an object of the present invention is to provide a spherical roller bearing design which is more adaptable and useful for different load conditions.

The objects have been achieved by the features as presented in the independent claims. Advantageous embodiments of the invention can be found in the dependent claims and in the accompanying description and drawings.

According to the first aspect thereof, the objects have been achieved by a spherical roller bearing, comprising, an outer ring presenting at least one inner raceway, an inner ring presenting a first and a second outer raceway, a plurality of roller elements arranged in a first and second roller row in-between the at least one inner raceway and the respective first and second outer raceway. Moreover, the bearing comprises a cage for retaining and/or guiding the roller elements in the first and second roller row. The cage presents a plurality of cage pockets, in which each cage pocket one of the roller elements is meant to be located. The bearing further presents a specific pitch circle diameter (PCD). The cage is arranged such that; when, during operation, a loaded zone of the bearing is located at a radial top region of the bearing in relation to the direction of the force of gravity, the cage is roller centered on the axially inner ends of the roller elements, and when, during operation, a loaded zone is located at a radial bottom region of the bearing in relation to the direction of the force of gravity, the cage is under-pitch roller centered in relation to the pitch circle diameter (PCD).

A bearing's pitch circle diameter is something which is well known by the skilled person. The pitch circle diameter can be defined as the diameter that intersects the rotational axle of the roller elements in the bearing in an axial location of the bearing. In addition, the phrases axial and radial are frequently used in this document. If nothing else is stated, an axial direction is defined as the axial direction of the bearing which is parallel to its rotational axis, the axial direction of the inner ring which is parallel to its rotational axis, the axial direction of the outer ring which is parallel to its rotational axis and the axial direction of the cage which is parallel to its rotational axis. Radial direction is the direction which is perpendicular to the corresponding axial directions.

The inventors have realized that it is important to center the cage on the rollers in the loaded zone of the bearing. The reason for this is that the rollers will behave more consistently in the loaded zone and will not skew or fluctuate. Therefore, it would be advantageous to center the cage on the rollers which are in the loaded zone. With the arrangement of the bearing and the cage as presented above, the cage will be roller centered in the loaded zone either if the loaded zone is located in a radial top or bottom region of the bearing. The cage will then behave in a more stable manner in the bearing during operation. This bearing design will provide a higher flexibility since the bearing is adapted for different load situations, which is another advantage of the present invention. This may also lead to a cost advantage since the assortment of different bearing types may be reduced, i.e. an advantage in terms of economies of scale.

In an embodiment of the present invention, the cage is essentially in-pitch roller centered in relation to the pitch circle diameter when there is a force acting in the axial direction of the bearing. This arrangement would provide an even more flexible bearing that also would be optimized for situations when an axial force is acting on the bearing. In a further embodiment, the essentially in-pitch roller centering is arranged such that one of the first or second roller rows is in contact with the cage. The essentially in-pitch roller centering can thus be achieved by allowing one of the roller rows to center the cage in the bearing when there is an axial force acting on the bearing. In a further embodiment, the cage pockets present a specific radial and tangential gap in relation to the roller elements contained therein. The tangential gap is adapted such that the cage pockets will contact the roller elements contained therein when an axial force is applied to the bearing. Thus, by adjusting the tangential gap in the cage pocket, the essentially in-pitch centering of one of the roller rows can be accomplished. Depending on in which direction the axial force is acting, either the first or the second roller row will center the cage.

In an embodiment of the present invention, each cage pocket further presents a cage pocket bottom which faces the axially inner end of the roller element in the respective cage pocket, and wherein the cage pocket bottom is arranged to be able to contact the axially inner end of the roller element either:
  radially outwardly from the pitch circle diameter (PCD),
  essentially in the pitch circle diameter (PCD), or
  radially inwardly from the pitch circle diameter (PCD).
    Thus, the roller centering function for the cage can occur between the cage pocket bottom surface and the end face of the roller element which is located in the respective cage pocket when the loaded zone is located at a radial top region in relation to the direction of the force of gravity. Further, the roller centering can occur at any portion of the roller end.

In an embodiment of the present invention, two essentially axially opposite cage pocket bottoms for the first and second respective roller rows are relatively inclined and essentially following the contact angles of the respective first and second roller rows. With this design, the two axially opposite cage pocket bottoms will assume a wedge-like shape between its roller elements in the respective first and second roller rows. This will lead to a firm and stable contact between the rollers and the cage.

In an embodiment of the present invention, a spherical roller is presented, wherein for at least one cage pocket, the cage pocket and the roller element being present therein further presents a specific cage pocket/roller element radial play, and wherein the cage pocket/roller element radial play is larger in the radially outward direction than in the radially inward direction with respect to the pitch circle diameter. By designing the cage pockets in this manner, the contact between the roller elements and the cage will be an underpitched contact, i.e. the contact will be radially inwardly from the pitch circle diameter of the bearing when the loaded zone is located in a radial bottom region of the bearing in relation to the direction of the force of gravity.

In an embodiment of the present invention, the bearing does not present any spacer ring, such as a guide ring, or mid-flange axially in-between the first and second roller rows. It is well known to make use of a guide ring axially in-between the two roller rows of the bearing. The guide ring is especially useful when the bearing is used in more high-speed applications. In addition, the cage is often centered on the guide ring, which in turn is in contact with the inner ring. By removing the guide ring from the bearing, there will be fewer components. This is of course advantageous in terms of cost, but also it may lead to a more robust bearing design due to the fact that there will be fewer components in the bearing. Moreover, a mid-flange, which is frequently used in prior art designs, is also costly to have since the manufacturing of an inner ring comprising a mid-flange will be more complicated. Also, the presence of a mid-flange will result in more material, leading to a higher weight and also a higher material cost. In addition, the design of the present invention will lead to that there will be a free space between the cage and the inner ring in-between the first and second roller row. This space can be used for lubricant, such as grease or oil. This may lead to that the lubrication of the contact between the raceways of the inner ring and the roller elements is improved since the lubricant can be stored in the proximity of these contact zones.

In another embodiment, a spacer ring or guide ring for guiding the roller elements is present axially in-between the first and the second roller row. A spacer ring may be needed in applications where there are higher rotating speeds. For instance, the spacer ring may guide the roller elements in the first and second roller row.

In an embodiment of the present invention, a spherical roller bearing is presented, wherein at least one of the plurality of cage pockets is radially outwardly enclosing the roller contained therein such that the roller element will be restricted to move radially outwardly out from the at least one cage pocket. By having such a design the roller elements can be prevented from falling out from the bearing, for instance during assembly of the bearing. In another embodiment, the inner ring further presents a first and second axially outer region on opposite axial sides of the bearing, wherein the respective first and second axially outer region presents a first and second respective side flange. The side flange can further improve and prevent rollers from falling out from the bearing.

In an embodiment of the present invention, the cage is a comb-shaped cage (also known as a pronge type cage). In an embodiment, the cage is made of a polymer, a metal such as brass, steel or iron, or any other suitable material recognized by the skilled person.

According to the second aspect of the invention, a bearing arrangement is presented, wherein the bearing arrangement comprises a bearing according to the first aspect of the invention. It shall be noted that any embodiment of the first aspect of the invention is applicable to any embodiment of the second aspect of the invention and vice versa. As stated hereinabove, the new bearing design will provide more flexibility since the bearing is adapted for different load conditions. In an embodiment, the bearing arrangement is meant to be in an essentially horizontal position.

In an embodiment of the present invention, a bearing arrangement for low-speed rotating applications is presented, wherein the bearing arrangement is meant to rotate at a speed of less than 50 routes per minute. In another embodiment, the rotating speed is less than any of 40, 30, 20 or 10 routes per minute. In another embodiment, the rotating speed is such that the rotating speed is lower than the threshold orbital speed at which roller elements are affected by centrifugal forces that exceeds the force of gravity.

Other embodiments and modifications to the current embodiments presented herein within the scope of the claims would be apparent to the skilled person. For example, the skilled person will understand and realize that the cage pocket geometry can be designed differently to still achieve the same effect, i.e. that the cage will be adaptively roller centered depending on the location of the loaded zone.

BRIEF DESCRIPTION OF THE DRAWINGS

Exemplifying embodiments of the present invention will now be described in more detail, with reference to the accompanying drawings, wherein:

FIG. 2A shows a cross sectional view of a bearing according to an embodiment of the present invention;

FIG. 2B shows an enlarged view of a cage and rollers from the bearing as presented in FIG. 2A;

Figures 1A, 1B, 1C:
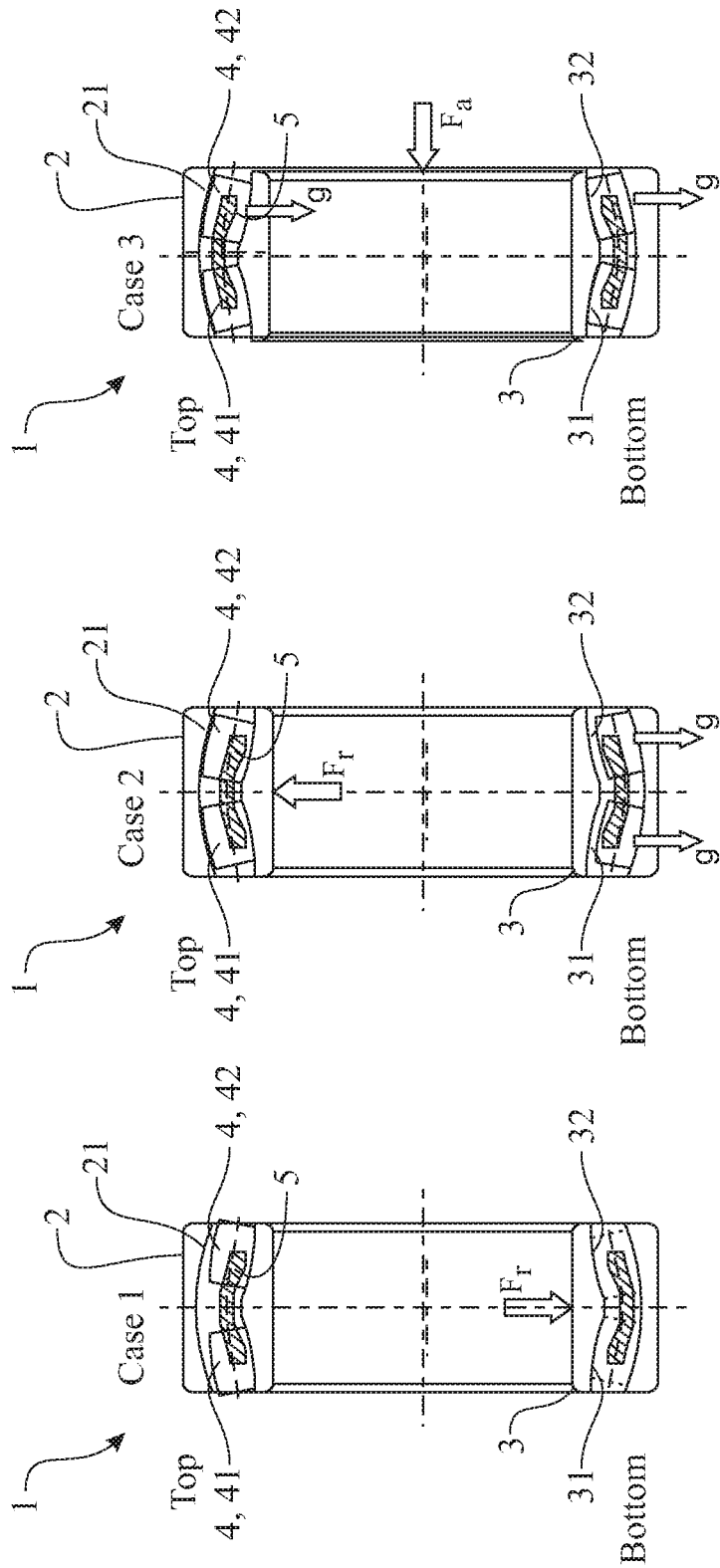
FIGS. 1A, 1B, and 1C show cross sectional views of a bearing according to an embodiment of the present invention.

The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention.

DETAILED DESCRIPTION OF THE INVENTION

In FIGS. 1A, 1B, and 1C an embodiment of a spherical roller bearing 1 according to the present invention can be seen. FIG. 1A shows the bearing 1 when there is a radial load Fr applied to the bearing 1 such that the loaded zone of the bearing is located in the radial bottom region of the bearing in relation to the gravity force. FIG. 1B shows the bearing 1 when there is a radial load Fr applied to the bearing 1 such that the loaded zone of the bearing is located in the radial top region of the bearing in relation to the gravity force. Finally, FIG. 1C shows the bearing 1 when there is an axial load Fa applied to the bearing 1. The bearing in FIGS. 1A, 1B, and 1C comprises an outer ring 2 presenting at least one inner raceway 21, an inner ring 3 presenting a first and a second outer raceway 31 and 32, a plurality of roller elements 4 arranged in a first and second roller row 41 and 42 in-between the at least one inner raceway 21 and the respective first and second outer raceways 31 and 32. Moreover, the bearing 1 comprises a cage 5 for retaining and/or guiding the roller elements 4 in the first and second roller row 41 and 42. The cage 5 presents a plurality of cage pockets 51, in which each cage pocket 51 one of the roller elements 4 is meant to be located. It can be further seen that the bearing presents a specific bearing play or clearance. The bearing 1 further presents a specific pitch circle diameter PCD. The cage 5 is arranged such that; when there is a radial force Fr acting on the inner ring and in the essentially opposite direction to the force of gravity (i.e. the loaded zone is located in the radial top region of the bearing), the cage 5 is roller centered on the inner axial ends of the rollers 4, and when there is a radial force Fr acting on the inner ring and in the essentially same direction as the force of gravity (i.e. the loaded zone is located in the radial bottom region of the bearing), the cage 5 is under-pitched roller centered in relation to the pitch circle diameter PCD. In this embodiment shown, the inner ring of the bearing 1 is supposed to be rotating. In another embodiment, the outer ring 2 may be supposed to be rotating. In addition, in this specific embodiment as seen in FIGS. 1A, 1B, and 1C, when there is a force Fa acting in the axial direction of the bearing 1, the cage 5 is essentially in-pitch roller centered in relation to the pitch circle diameter PCD. With this design of the bearing 1 and the cage 5, a more flexible and robust bearing 1 for different conditions can be realized. Moreover, the cage 5 will center itself on the rollers 4 and in the loaded zone L of the bearing 1. When the loaded zone is located in the radial bottom region of the bearing in relation to the direction of the gravity force, the bearing clearance will be seen in the radial top section of the bearing 1. In the case when the rotational speed is not very high (so that centrifugal forces acting on the rollers will move the rollers axially outwardly from the bearing) the rollers will tend to "fall out" axially from the bearing 1 as shown in FIG. 1A. In FIG. 1B it can be seen that the clearance will appear in the radial bottom region of the bearing 1. In this case, the force of gravity will strive to move the rollers axially inwardly in the bearing 1. In FIG. 1C, one of the bearing's roller rows 41 will be loaded while the other row 42 will not be loaded. Thus, depending on where in the bearing the clearance is present, and thus also the location of the loaded zone L, the cage 5 of the bearing 1 will be roller centered on either the axial ends of the rollers 4 or on the rolling surfaces of the roller elements 4.

Now turning to FIGS. 2A and 2B, another embodiment of the present invention is disclosed. Here an example will be seen of how the cage pocket 51 geometry can be designed in order to achieve the under-pitch centering of the cage 5 when the loaded zone is located in the radial bottom region of the bearing 1. In FIG. 2A, the bearing 1 comprises an outer ring 2 which presents an inner spherical raceway 21. Moreover, the bearing 1 presents a cage 5, roller elements 4 arranged in a first and second roller row 41 and 42, and an inner ring 3 presenting a first and second outer raceway 31 and 32. The roller rows 41 and 42 are located in-between the respective first and second raceway, 31 and 32, and the inner spherical raceway 21. The cage 5 is designed such that the cage 5 is under-pitched roller centered. In FIG. 2A this is illustrated by the contact portion 511 on the cage 5, where the cage 5 will contact the roller elements 4. As further can be seen in FIG. 2A, there is no spacer ring (such as a guide ring) or mid-flange located in-between the first and second roller rows 41 and 42. Now turning to FIG. 2B, it will be clearly seen how the contact portion 511 in the cage pocket 51 comes into contact with the roller element 4. In this specific embodiment, the radial play of the cage pocket 51 is designed so that the radial play is larger in the radially outward direction than in the radially inward direction in respect of the pitch circle diameter PCD of the bearing. This will result in that the rollers 4 will contact the cage 5 at the contact portion 511 as indicated in FIG. 2B when the loaded zone is located in the radial bottom region of the bearing 1 in relation to the gravity force. Further, it will lead to that there will be a clearance 514 between the cage pocket 51 and the roller elements 4 on the opposite side of the cage 5.

Figure 3:
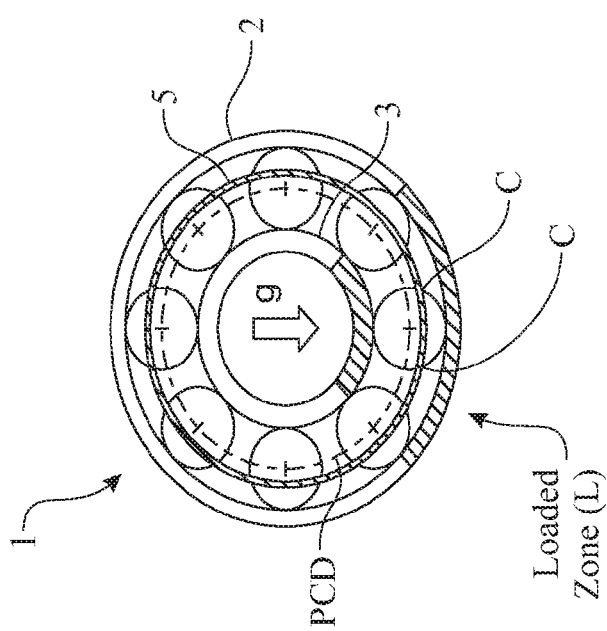
FIG. 3 shows a view from the side of a bearing according to an embodiment of the present invention.

FIG. 3 shows an axial side face view of a bearing 1 according to an embodiment of the present invention. The bearing 1 comprises an outer ring 2 which presents an inner spherical raceway 21. Moreover, the bearing 1 presents a cage 5, roller elements 4, and an inner ring 3 presenting a first and second outer. The roller rows are located in-between the respective first and second raceway, and the inner spherical raceway 21. The cage 5 is designed such that the cage 5 is under-pitch roller centered. Further in this view, it can be seen that there are contact portions C between the rollers 4 and the cage 5, where the contact is occurring radially inwardly from the pitch circle diameter PCD, i.e. the cage is under-pitched roller centered. As further can be seen in this figure, there is a loaded zone L in the bearing which is located at the radial bottom region of the bearing 1 in relation to the direction of the gravity force g. Thus, by having an under-pitched roller centered cage 5 when the loaded zone L is located in the region of the gravity force, the cage 5 will be centered by the rollers 4 in the loaded zone L, which will lead to a more stable behavior of the cage 5 during operation.

Figure 4:
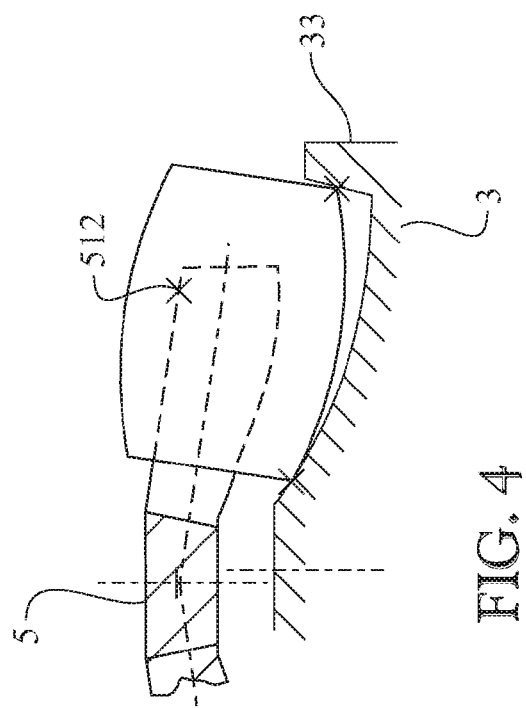
FIG. 4 shows an enlarged cross sectional view of a portion of a bearing according to an embodiment of the present invention.

FIG. 4 shows a portion of a cross sectional view of a bearing 1 according to an embodiment of the present invention. In this view, a portion of an inner ring 3 can be seen, a cage 5, a roller 4 and a side flange 33 of the inner ring 3. Further, here it can be seen that the cage pocket 51 is outwardly enclosing the roller such that the roller 4 will not be able to move radially outwardly out from the cage pocket 51. This has been done by having a curved profile in the cage pocket 51 such that the roller 4 will eventually contact a contact portion 512 of the cage pocket 51. In addition, the side flange 33 will prevent the roller 4 from axially falling out from the bearing 1. This will lead to that the rollers 4 will be self-contained in the bearing 1. Thus, there is no need for having for example a window-type cage. The rollers 4 will still not be able to fall out from the bearing at any time. This is advantageous, especially for safety reasons.

Figure 5:
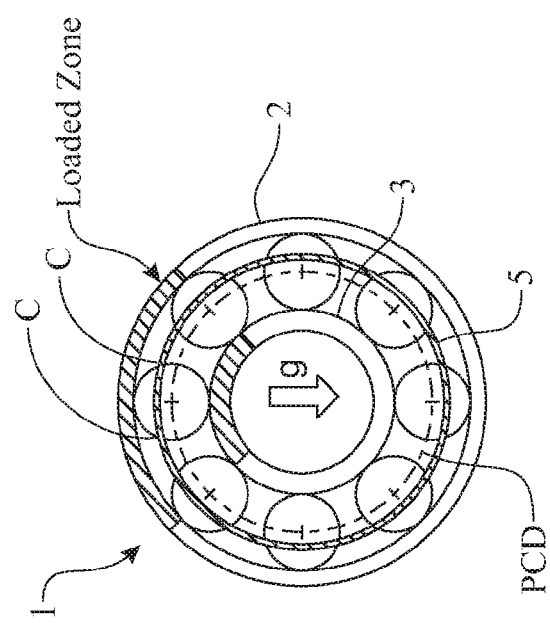
FIG. 5 shows a view from the side of a bearing according to an embodiment of the present invention.

FIG. 5 shows an embodiment where it more in detail can be seen that the cage 5 will be over-pitch roller centered when the loaded zone L is located in the radial top region of the bearing 1 in relation to the direction of the gravity force g. It can be seen that the contact C between the cage 5 and the roller elements 4 will occur radially outside the pitch circle diameter (PCD). In this figure and embodiment, the outer ring 2, inner ring 3 is also seen. In addition, a loaded zone L acting in the radial top region of the bearing 1 is shown.

Figure 6:
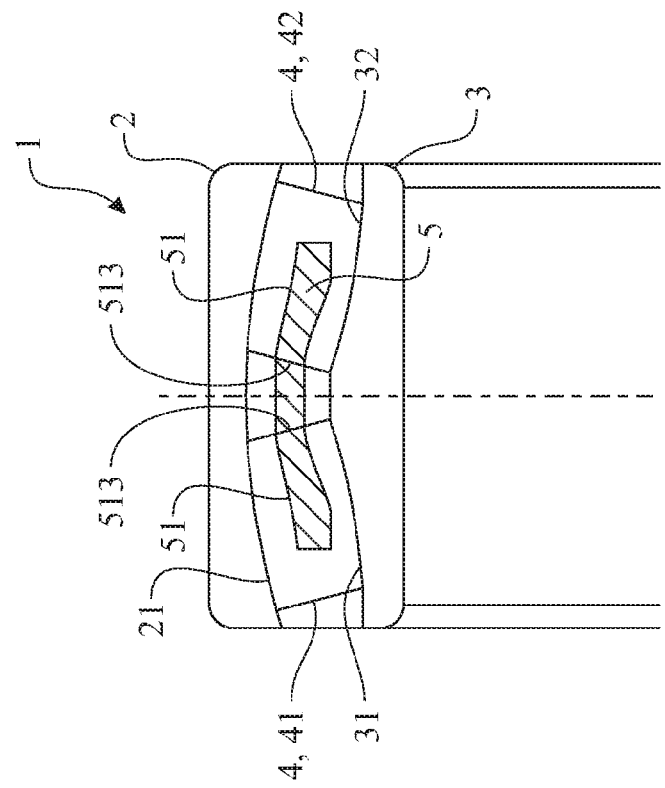
FIG. 6 shows a cross sectional view of a bearing according to an embodiment of the present invention.

FIG. 6 shows another cross sectional view of a bearing 1 according to an embodiment of the present invention. The bearing 1 comprises an outer ring 2 with one inner spherical raceway 21, an inner ring 3 presenting a first and a second outer raceway 31 and 32, a plurality of roller elements 4 arranged in a first and second roller row, 41 and 42, in-between the at least one inner raceway 21 and the respective first and second outer raceways 31 and 32. Moreover, the bearing 1 comprises a cage 5 for retaining and/or guiding the roller elements 4 in the first and second roller rows 41 and 42, the cage 5 presents a plurality of cage pockets 51, in which each cage pocket 51 one of the roller elements 4 is meant to be located. The bearing 1 further presents a specific pitch circle diameter (PCD), and the cage 5 is roller centered on the inner axial ends of the roller elements 4 when the loaded zone is located at a radial top region of the bearing 1. Further, in this embodiment, it can be seen that the cage pockets 51 present cage pocket bottoms 513 which are located on an axial inner side of the cage pockets 51 and which are facing the inner axial ends of the roller elements 4 in the respective first and second roller rows 41 and 42. The cage 5 will contact the axial ends of the roller elements 4 at the cage pocket bottoms 513. In addition, the cage pocket bottoms 513 are inclined and essentially in line with the contact angles of the first and second roller rows 41 and 42. Due to this, the two oppositely located cage pocket bottoms 513 will be shaped as a wedge. This will lead to that the cage 5 will "fall down" on the axial side faces of the roller elements 4 due to the gravity force g. In this situation, there is no clearance in the radial top region of the bearing 1; instead the clearance is present in the radial bottom region.

Figure 7:
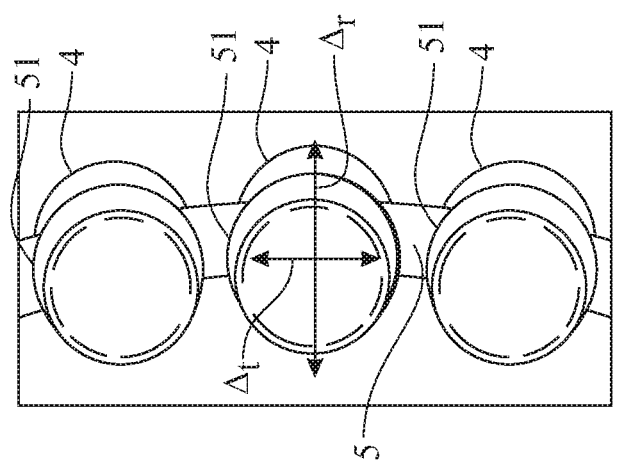
FIG. 7 shows an enlarged view of a cage and rollers of a bearing according to an embodiment of the present invention.

FIG. 7 shows an enlarged view of a cage 5 and rollers 4 of a bearing according to an embodiment of the present invention. Further, the cage pockets 51 can be seen. The cage pocket 51 presents a specific radial gap $\Delta r$ so that the roller element 4 can fluctuate in a radial direction of the cage 5. Further, the cage pocket presents a specific tangential gap $\Delta t$ so that the roller element 4 also can fluctuate in the tangential direction of the cage 5. The tangential gap $\Delta t$ will be set such that the roller element 4 and the cage pocket 51 will contact each other when there is an axial force acting on the bearing. Further, the centering of the roller elements 4 will then essentially be in the pitch circle diameter PCD of the bearing. When setting the gap $\Delta t$ the bearing clearance, the roller element profile, the cage pocket profile etc. also needs to be taken into consideration.

Figure 8:
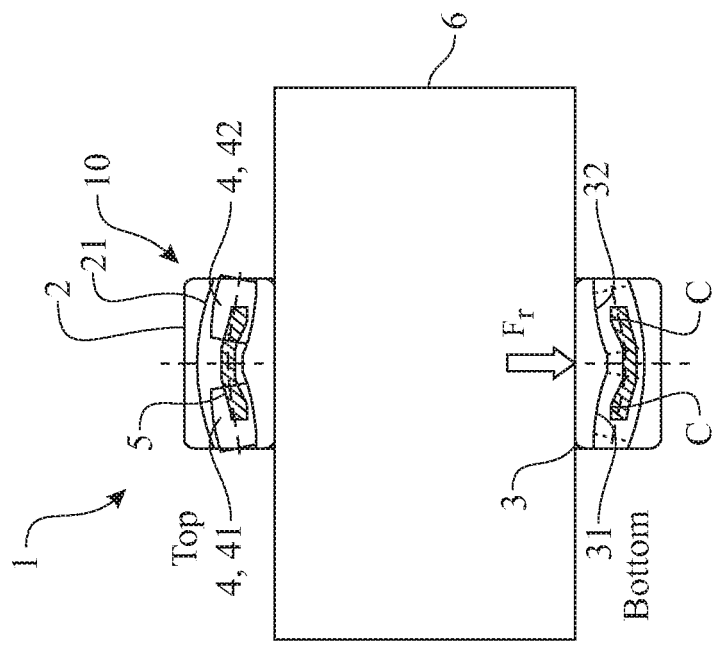
FIG. 8 shows an embodiment of a bearing arrangement according to the second aspect of the invention.

Now turning to FIG. 8, an embodiment of a bearing arrangement 10 according to the second aspect can be seen. In this embodiment a radial force Fr is acting in the same direction as the gravity force and on the inner ring 3 (the loaded zone will be in the radial bottom region of the bearing). The arrangement 10 comprises a bearing 1 according to the first aspect of the invention and a shaft 6. The bearing 1 comprises an outer ring 2 and an inner ring 3, and a first and second roller row 41 and 42 with roller elements 4. It can be seen in the figure that there is a contact C between the cage 5 and the roller elements 4 in the radial bottom region of the bearing 1 where the force Fr is acting. Further, the bearing clearance (exaggerated in this figure) can be seen in the radial top region of the bearing.

Figure 9A:
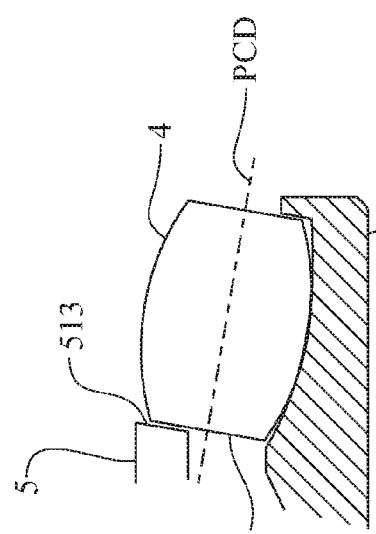
FIGS. 9A, 9B, and 9C shows a cross sectional view of an inner ring, a portion of a cage and a roller of a bearing according to an embodiment of the invention.
Figure 9B:
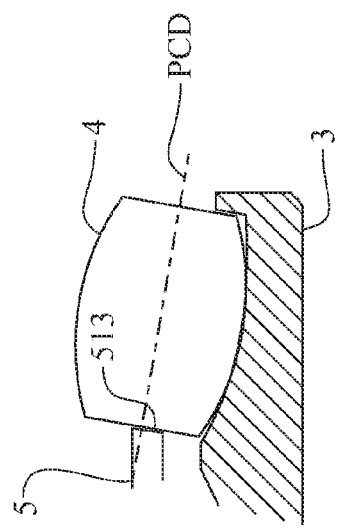
Figure 9C:
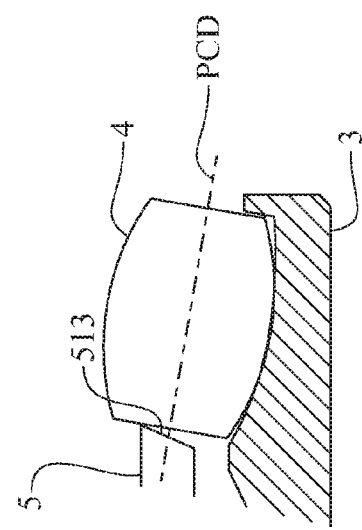

In FIGS. 9A, 9B, and 9C, three examples of how the roller end centering can be accomplished are shown. Starting from the top, showing a cross sectional view of an inner ring 3, a roller element 4 and a portion of a cage 5, it can be seen the roller end contacts the cage pocket bottom 513 radially outwardly from the pitch circle diameter PCD. In the illustration in the middle, it can be seen that the roller end contacts the cage pocket bottom 513 under or even close to the pitch circle diameter PCD. In the illustration in the bottom, another example of an over-pitch roller end centering is seen. The angle of the cage pocket bottom 513 can also be different as seen in the three illustrations. The centering on the roller element ends will advantageously occur when the loaded zone is located in the radial top region of the bearing 1 in relation to the direction of the gravity force.

The invention claimed is:

1. A spherical roller bearing, comprising:
an outer ring having at least one inner raceway,
an inner ring having a first and a second outer raceway,
a plurality of roller elements arranged in a first and second roller row disposed between the at least one inner raceway and the respective first and second outer raceway,
a cage for at least one of retaining and guiding the roller elements in the first and second roller row, the cage providing a plurality of cage pockets, wherein in each cage pocket one of the roller elements is meant to be located,
the bearing further having a specific pitch circle diameter (PCD), wherein
the cage is arranged such that; during operation, when a loaded zone of the bearing is located at a radial top region of the bearing in relation to the direction of the force of gravity (g), the cage is roller centered on the axially inner ends of the roller elements, and wherein
during operation, when the loaded zone is located at a radial bottom region of the bearing in relation to the direction of the force of gravity (g), the cage is under-pitch roller centered in relation to the pitch circle diameter (PCD).

2. The spherical roller bearing according to claim 1, wherein, when there is a force acting in the axial direction of the bearing, the cage is in-pitch roller centered in relation to the pitch circle diameter.

3. The spherical roller bearing according to claim 2, wherein the in-pitch roller centering is arranged such that one of the first or second roller rows is in contact with the cage.

4. The spherical roller bearing according to claim 1, wherein each cage pocket further provides a cage pocket bottom that faces the axially inner end of the roller element in the respective cage pocket, and wherein the cage pocket bottom is configured to be able to contact the axially inner end of the roller element by one of:
radially outwardly from the pitch circle diameter (PCD),
in the pitch circle diameter (PCD), and
radially inwardly from the pitch circle diameter (PCD).

5. The spherical roller bearing according to claim 4, wherein two essentially axially opposite cage pockets bottoms for the first and second respective roller rows are relatively inclined and essentially following the contact angles of the respective first and second roller rows.

6. The spherical roller bearing according to claim 1, wherein for at least one cage pocket, the cage pocket and the roller element disposed therein further provides a specific cage pocket/roller element radial play, and wherein the cage pocket/roller element radial play is larger in the radially outward direction than in the radially inward direction with respect to the pitch circle diameter (PCD) to thereby accomplish the under-pitch roller centering when the loaded zone (L) is located in the radial bottom region of the bearing.

7. The spherical roller bearing according to claim 1, wherein no spacer ring is disposed axially in-between the first and second roller rows.

8. The spherical roller bearing according to claim 1, wherein at least one of the plurality of cage pockets is radially outwardly enclosing the roller element contained therein such that the roller element will be restricted to move radially outwardly out from the at least one cage pocket.

9. The spherical roller bearing according to claim 1, wherein the inner ring further provides a first and second axially outer region on opposite axial sides of the bearing, and wherein the respective first and second axially outer region includes a first and second respective side flange.

10. The spherical roller bearing according to claim 1, wherein the cage is a comb-shaped cage.

11. The spherical roller bearing according to claim 1, wherein no mid-flange is disposed axially in-between the first and second roller rows.

12. A bearing arrangement having a bearing, the bearing comprising:
an outer ring having at least one inner raceway,
an inner ring having a first and a second outer raceway,
a plurality of roller elements arranged in a first and second roller row disposed between the at least one inner raceway and the respective first and second outer raceway,
a cage for at least one of retaining and guiding the roller elements in the first and second roller row, the cage providing a plurality of cage pockets, wherein in each cage pocket one of the roller elements is meant to be located,
the bearing further having a specific pitch circle diameter (PCD), wherein
the cage is arranged such that; during operation, when a loaded zone of the bearing is located at a radial top region of the bearing in relation to the direction of the force of gravity (g), the cage is roller centered on the axially inner ends of the roller elements, and wherein
during operation, when the loaded zone is located at a radial bottom region of the bearing in relation to the direction of the force of gravity (g), the cage is under-pitch roller centered in relation to the pitch circle diameter (PCD).

* * * * *